US008832958B2

(12) United States Patent
Mabey (10) Patent No.: US 8,832,958 B2
(45) Date of Patent: Sep. 16, 2014

(54) REMOVABLE HOLDING TOOL FOR MEASURING DEVICES

(75) Inventor: Todd W. Mabey, Bloomingdale, NJ (US)

(73) Assignee: Todd Mabey Innovations, Inc., West Milford, NJ (US)

(*) Notice: Subject to any disclaimer, the term of this patent is extended or adjusted under 35 U.S.C. 154(b) by 337 days.

(21) Appl. No.: 12/890,211

(22) Filed: Sep. 24, 2010

(65) Prior Publication Data

US 2012/0073155 A1    Mar. 29, 2012

(51) Int. Cl.
*G01B 3/10* (2006.01)

(52) U.S. Cl.
CPC ...... *G01B 3/1005* (2013.01); *G01B 2003/1015* (2013.01); *G01B 2003/1012* (2013.01)
USPC .............................................. 33/770; 33/758

(58) Field of Classification Search
CPC ...... G01B 3/10; G01B 3/1056; G01B 3/1071; G01B 3/1076; G01B 3/1079
USPC ............................. 33/755, 758, 759, 760, 770
See application file for complete search history.

(56) References Cited

U.S. PATENT DOCUMENTS

| | | | |
|---|---|---|---|
| 2,711,030 A * | 6/1955 | Drew et al. ................ 33/758 |
| 3,289,305 A * | 12/1966 | Norton ....................... 33/759 |
| 3,744,134 A * | 7/1973 | Zima, Jr. ..................... 33/768 |
| 4,103,426 A | 8/1978 | Robin | |
| 4,164,334 A | 8/1979 | Rathbun et al. | |
| 4,305,206 A | 12/1981 | Roe | |
| 4,429,462 A * | 2/1984 | Rutty et al. ................ 33/757 |
| 4,976,041 A | 12/1990 | Oshiro et al. | |
| 4,999,924 A * | 3/1991 | Shields ...................... 33/770 |
| 5,010,657 A | 4/1991 | Knapp | |
| 5,079,848 A | 1/1992 | Oshiro et al. | |
| 5,421,100 A | 6/1995 | Leore | |
| 5,430,952 A | 7/1995 | Betts | |
| 5,481,813 A | 1/1996 | Templeton | |
| 5,542,184 A * | 8/1996 | Beard ........................ 30/293 |
| 5,600,894 A | 2/1997 | Blackman et al. | |
| 5,606,803 A | 3/1997 | O'Sullivan | |
| 5,659,970 A | 8/1997 | Reedy | |

(Continued)

FOREIGN PATENT DOCUMENTS

| | | | |
|---|---|---|---|
| GB | 2272290 A | * | 5/1994 |
| JP | 2000292104 A | * | 10/2000 |
| JP | 2002005604 A | * | 1/2002 |
| JP | 2005083822 A | * | 3/2005 |

OTHER PUBLICATIONS

English machine translation of JP 2000-292104 A (Hirokasu Yamada, published Oct. 20, 2000).*

(Continued)

*Primary Examiner* — R. A. Smith
(74) *Attorney, Agent, or Firm* — K&L Gates LLP (57) ABSTRACT

A removable and attachable tool for attachment to a measuring tape. The tool may have a body defining a cavity which is configured to receive the measuring tape. A cap may be hingedly attached to the body to secure the measuring tape in the cavity. The tool may have a mount, such as a tacky outer surface, for example, for temporarily affixing the tool to a workpiece. The tool may have a cavity for receiving a rigid member. The tool permits unassisted measuring using a measuring tape.

23 Claims, 12 Drawing Sheets

(56) References Cited

U.S. PATENT DOCUMENTS

| | | |
|---|---|---|
| 5,809,661 A | 9/1998 | Brown |
| 5,815,940 A * | 10/1998 | Valentine, Sr. ............... 33/770 |
| 5,845,412 A | 12/1998 | Arcand |
| 6,094,833 A | 8/2000 | Medley, Jr. |
| 6,272,765 B1 | 8/2001 | Li |
| 6,427,358 B1 | 8/2002 | LeBon et al. |
| 6,442,863 B1 | 9/2002 | Poineau et al. |
| 6,449,866 B1 * | 9/2002 | Murray ........................ 33/758 |
| 6,637,126 B2 | 10/2003 | Balota |
| 6,663,153 B2 | 12/2003 | Brunson |
| D486,086 S | 2/2004 | Jueneman |
| 6,698,679 B1 | 3/2004 | Critelli et al. |
| 6,718,649 B1 | 4/2004 | Critelli et al. |
| 6,839,981 B2 | 1/2005 | Rafter |
| 6,931,753 B2 | 8/2005 | Ryals et al. |
| 7,024,792 B2 | 4/2006 | Graham |
| 7,131,214 B1 | 11/2006 | Blackman et al. |
| D533,797 S | 12/2006 | Jueneman |
| D535,900 S | 1/2007 | McKinney |
| 7,159,331 B2 | 1/2007 | Critelli et al. |
| 7,159,332 B2 | 1/2007 | Sullivan |
| 7,174,656 B1 | 2/2007 | Smith |
| 7,260,898 B2 | 8/2007 | Snelson |
| 7,263,785 B2 | 9/2007 | Sullivan |
| D556,065 S | 11/2007 | Jones et al. |
| D565,441 S | 4/2008 | Critelli |
| 7,406,778 B2 | 8/2008 | Lee et al. |
| 7,434,330 B2 | 10/2008 | McEwan et al. |
| 7,475,492 B1 | 1/2009 | Huang |
| 7,596,881 B1 | 10/2009 | Bourgeois |
| 7,900,370 B1 | 3/2011 | Treige |
| 2011/0179662 A1 * | 7/2011 | Donovan et al. ............... 33/758 |

OTHER PUBLICATIONS

The International Search Report and the Written Opinion dated Jan. 18, 2012 issued for International Application No. PCT/US11/52698.

* cited by examiner

REMOVABLE HOLDING TOOL FOR MEASURING DEVICES

BACKGROUND

Measuring tape in tape measures can often be lengthy. Their length can be as much as several hundred feet in length. The measuring tape may be rolled up as a coil within the tape measuring case when the tape measure is not in use. When in use, the end of the measuring tape is pulled and the measuring tape is extracted from the case.

Measuring tapes come in a variety of shapes and sizes. Measuring tape can be made of metal, fiberglass or cloth. The leading end of the measuring tape can have a small, right angled piece of metal attached thereto enabling the user to grip the measuring tape and enabling the end of the measuring tape to be placed on an edge of a structure like a table top when measuring the dimensions of an object. Some types of measuring tapes, such as engineer's tapes, may have ring-type metal end piece. The other end of the measuring tape may be coiled tape inside the case and is carried by the measurer.

BRIEF DESCRIPTION OF THE DRAWINGS

The present invention will be more readily understood from a detailed description of example embodiments taken in conjunction with the following figures.

DETAILED DESCRIPTION

Various problems may occur when the user wishes to measure distances using measuring tape from a tape measure. Although the small piece of metal at the end of the measuring tape can be engaged to an edge of an object, it may become unengaged during the course of the measuring process. While a second user may assist in holding the end of the tape measure in place, this method is often impractical and undesirable. Additionally, it may be difficult to measure distances if the edge of the material to be measured is vertically oriented. As the user attempts to engage the metal end to the vertical edge of the material and extend the measuring tape, the measuring tape may be overcome by gravitational forces and fall from the material before a measurement is taken. Finally, in some environments, it is difficult obtain the desired measurements if the end of the measuring tape cannot be readily attached to the point of measurement.

In various embodiments, tools are disclosed that are attachable and removable to a portion of a measuring tape. For example, the tools may be selectively attached to the end of the measuring tape to allow the user to more easily ascertain measurements. As described in more detail below, in some embodiments the tool may have a tacky surface that allows the tool to be temporarily affixed to a workpiece. By mounting the tool to the workpiece, the user may obtain the desired measurements without the measuring tape becoming disengaged from the workpiece. In some embodiments, the tool is configured to receive a variety of different types of measuring tapes, such as steel or fiberglass, for example. The tools may also be configured to couple to measuring tapes having a variety of end pieces, such as measuring tapes with metal claws or engineer's tapes with ring-like metal rings, for example. The tools may be positioned on the measuring tape proximate the end piece, or anywhere along the extended measuring tape. In some embodiments, the tool may clamp the measuring tape such that the tool does not readily slide along the measuring tape. In other embodiments, the tool may be slidably attached to the measuring tape such that the measuring tape may slide through the tool during use.

In accordance with various embodiments, a removable and attachable apparatus for attachment to a measuring tape is described. The removable and attachable apparatus may have a body having a longitudinal axis, the body defining a cavity along the longitudinal axis, the cavity dimensioned to receive the measuring tape. The removable and attachable apparatus may also have a cap attachable to the body, the cap having an inner surface and an outer surface. The inner surface may have a protruding portion and the cap may be moveable between an open position and a closed position, where the protruding portion protrudes into the cavity in the closed position. The removable and attachable apparatus may also have a closure having a first closure portion and a second closure portion, the body having the first closure portion and the cap comprising the second closure portion, the closure locking the cap to the body in the closed position.

Optionally, the body of the removable and attachable apparatus may have a mount.

Optionally, the removable and attachable apparatus may have at least one of a mounting cavity and a tacky mounting surface.

Optionally, the body of the removable and attachable apparatus may define a lateral notch substantially perpendicular to the longitudinal axis.

Optionally, the body of the removable and attachable apparatus has a length in the longitudinal axis in the range of about 0.5" to about 2.25".

Optionally, the cavity of the removable and attachable apparatus is a concave cavity and the protruding portion is convex and substantially parallel to the concave cavity in the closed position.

Optionally, the protruding portion of the removable and attachable apparatus has at least one ridge extending along the inner surface and substantially parallel to the longitudinal axis. The at least one ridge may have a generally triangular cross-sectional profile.

In accordance with various embodiments, the removable and attachable apparatus has a body having a longitudinal axis and defining a cavity along the longitudinal axis. The cavity may be dimensioned to receive a measuring tape. A cap may be attached to the body with the cap having an inner surface and an outer surface. The inner surface may have a protruding portion that protrudes into the cavity. The removable and attachable apparatus may have a mount coupled to at least one of the body and the cap.

Optionally, the removable and attachable apparatus has a hinge attached to the body with the cap attached to the hinge. The cap be moveable between an open position and a closed position, where the convex protruding portion protruding into the cavity in the closed position. The removable and attachable apparatus may have a closure, where the closure locking the cap to the body in the closed position.

Optionally, the mount of the removable and attachable apparatus is one of a tacky mounting surface, a suction cup, and a mounting cavity.

Optionally, the body defines a lateral notch substantially perpendicular to the longitudinal axis.

In accordance with various embodiments the removable and attachable apparatus has a body having a longitudinal axis, the body defining a cavity along the longitudinal axis, the cavity dimensioned to receive the measuring tape. The body may define a lateral notch substantially perpendicular to the longitudinal axis. The removable and attachable apparatus may comprise a hinge attached to the body and a cap attached to the hinge. The cap may have an inner surface and an outer surface, with the cap moveable between an open position and a closed position. At least one of the inner surface and the body may have at least one ridge and at least one of the cap and the body may define a mounting cavity.

Optionally, the cavity is a concave cavity and the mounting cavity has a substantially circular cross-sectional profile.

Optionally, the body of the removable and attachable apparatus has a lateral outer width, the lateral notch laterally extending less than the outer lateral width.

Optionally, at least one ridge has a generally triangular cross-sectional profile.

Optionally, the removable and attachable apparatus has a first ridge and a second ridge, with the first and second ridges coupled to the inner surface of the cap and extending substantially along the longitudinal axis.

Optionally, the first and second ridges are substantially parallel.

Optionally, the body of the removable and attachable apparatus has a cylindrical mounting shaft, the cylindrical mounting shaft defining the mounting cavity.

Optionally, the removable and attachable apparatus has at least one tacky outer surface.

Figure 1:
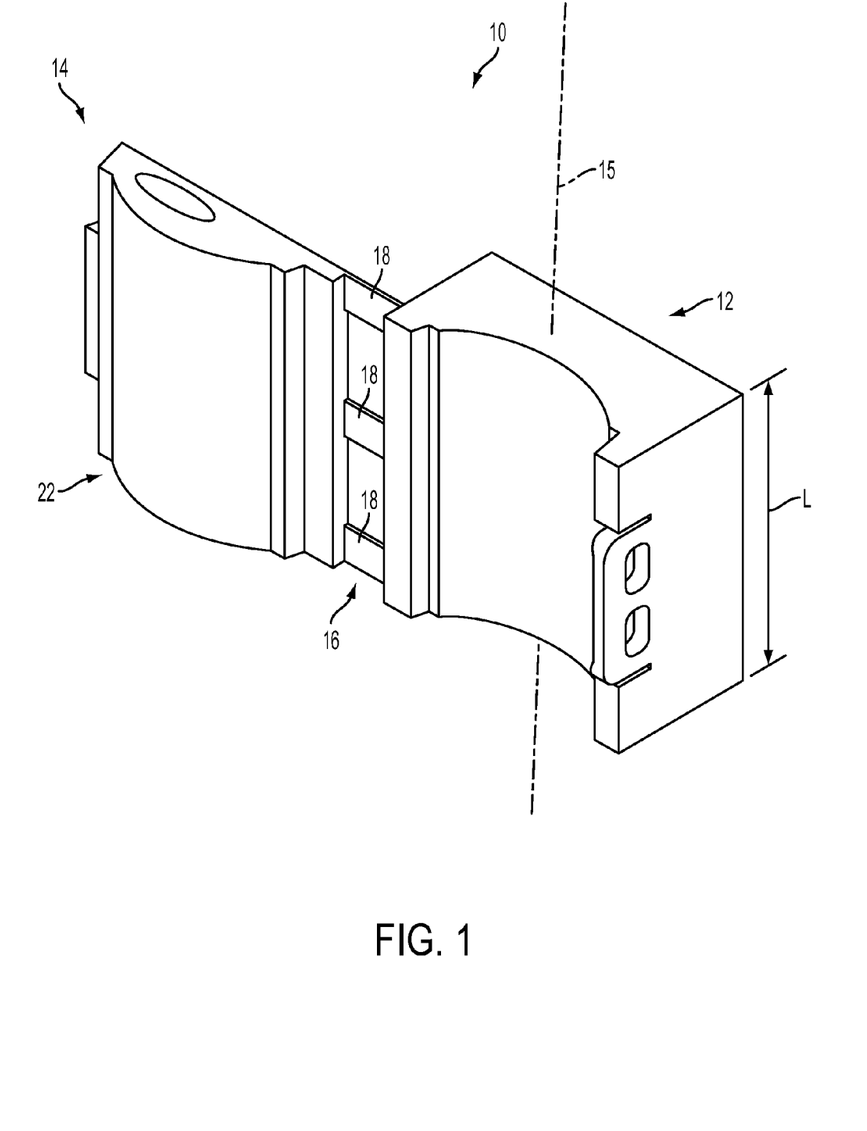
FIG. 1 is a perspective view of a tool in an open position in accordance with one non-limiting embodiment.

FIG. 1 is a perspective view of a tool 10 in an open position in accordance with one non-limiting embodiment. In one embodiment, the tool 10 has a body 12 and a cap 14. The body 12 may be any suitable shape, such as rectangular, for example. The body 12 defines a longitudinal axis 15. In one embodiment, the body 12 has a length (illustrated as "L") in the longitudinal direction of about 2". In some embodiments, the length L may be in the range of about 0.5" to about 2.25", for example. The cap 14 may be hingedly attached to the body 12. A hinge 16 couples the cap 14 to the body 12. In one embodiment, the hinge 16 is a plurality of flexible connectors 18. In other embodiments, other suitable types of hinges may be used, such a living hinge, for example.

Figure 2:
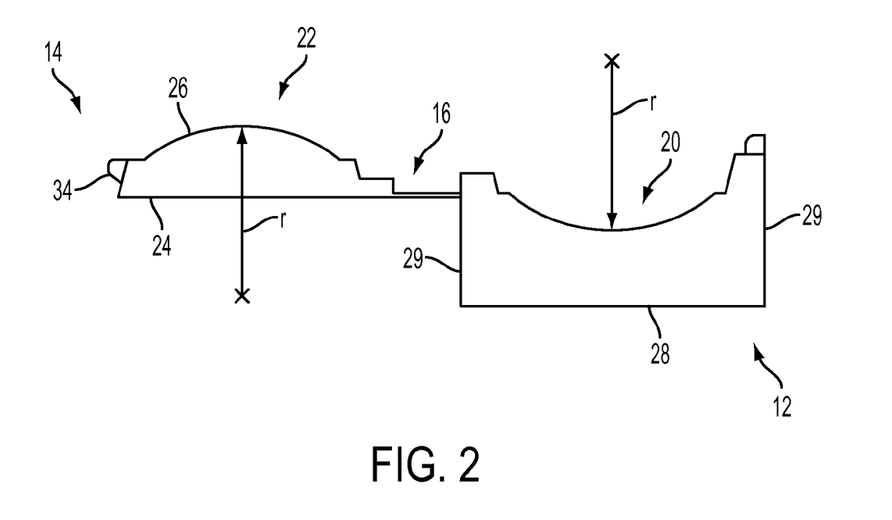
FIG. 2 is an end view of the tool of FIG. 1.

FIG. 2 is an and view of the tool 10. As illustrated in FIGS. 1 and 2, the body 12 defines a cavity 20 that extends along the longitudinal axis 15. The cavity 20 may be any suitable shape. In the illustrated embodiment, the cavity 20 is concave and has an arc with a radius "r". As discussed in more detail below, the arc of the cavity 20 may be substantially similar to the arc of a measuring tape. The body 12 has a bottom surface 28 and side surfaces 29. The cap 14 may have an inner surface 22 and an outer surface 24. The inner surface 22 may define a protruding portion 26. In one embodiment, the protruding portion 26 is convex, having an arc radius "r" similar to the cavity 20.

Figure 3:
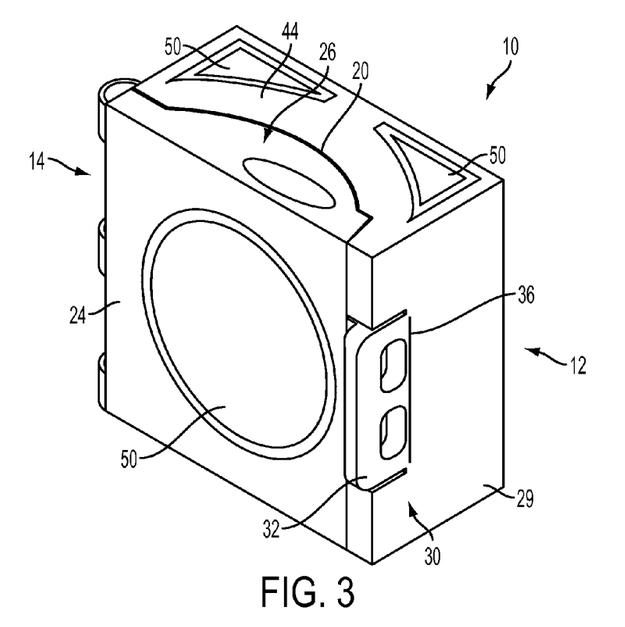
FIGS. 3 and 4 are perspective views of a tool in a closed position in accordance with one non-limiting embodiment.
Figure 4:
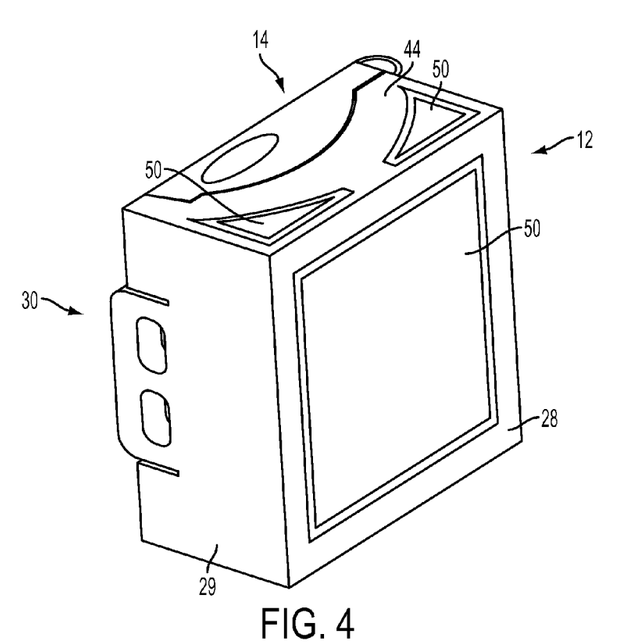

FIGS. 3 and 4 are perspective views of the tool 10 in a closed position in accordance with one non-limiting embodiment. As illustrated, the protruding portion 26 extends into the cavity 20. A closure 30 may be used to selectively secure the cap 14 to the body 12. The closure 30 may be any structure, component, or collection of components that allows the cap 14 to be secured to the body 12 in the closed position. In one embodiment, the closure 30 comprises a first closure portion 32 coupled to the body 12 and a second closure portion 34 (FIG. 2) coupled to the cap 14. A living hinge 36, for example, may be allow the first closure portion 32 to flex outwardly and receive the second closure portion 34 when the tool 10 is transitioned from the open position to the closed position. As is to be appreciated, the closure 30 may be implemented using any suitable technique. For example, in one embodiment the first closure portion 32 comprises a detent and the second closure portion 34 comprises a protrusion that is received by the detent in the closed position. In one embodiment, the closure 30 is a clasp. In one embodiment, the closure 30 includes a ridge on the cap 14 and a groove on the body 12 for receiving the ridge. In one embodiment, the closure 30 comprises at least one magnetic element. In one embodiment, the closure 30 is implemented using hook and loop fasteners. In one embodiment, the closure 30 is implemented using a non-permanent adhesive. In any event, the closure 30 is in an unlocked position when the tool 10 is in the open position and the closure 30 is in a locked position when the tool 10 is in the closed position.

At least one outer surface of the tool 10 may comprise a mount to facilitate temporarily attaching the tool 10 to a surface. In some embodiments, the mount may include, for example, a suction cup that affixes the tool 10 to an object using vacuum force. In some embodiments, the mount may include a magnet, for example, for attaching the tool 10 to a magnet-compatible object. In some embodiments, as described in more detail below, the mount may include a mounting cavity for receiving a rigid member. In some embodiments, the mount may be a tacky surface or highly-frictional surface. In some embodiments, at least one of the bottom surface 28 (FIG. 4), the side surfaces 29, front surface 44, or the cap's outer surface 24 may comprise a tacky surface. FIG. 4 is a perspective view of the tool 10 having a tacky surface 50 positioned on the bottom surface 28 of the body 12. In the illustrated embodiment, the tacky surface 50 is rectangular. It is to be appreciated that the tacky surface 50 may be any suitable shape, such as circular or triangular, for example. In some embodiments, the tacky surface 50 may comprise a plurality of tacky surfaces. The tacky surface 50 allows the tool 10 to temporarily stick or otherwise mate to a material in order to assist the user in ascertaining a measurement. The tacky surface 50 may be any suitable non-residual substance that permits temporary attachment, such as, for example, GLUE DOTS available from Glue Dots International, New Berlin, Wis. As illustrated in FIGS. 3 and 4, the tacky surface 50 may be positioned on any surface of the tool 10. For example, the outer surface 24 of the cap 14 may include a tacky surface 50. Additionally, the side surfaces 29 and a back surface 48 may include tacky surfaces 50. In some embodiments, the tacky surface 50 may include a removable cover that allows the user to cover the tacky surface 50 while not in use. In one embodiment, only the bottom surface 28 has a tacky surface 50. In various embodiments, the tacky surface 50 may be detachable and/or replaceable. For example, in dirty work environments, the tacky surface 50 may collect contaminants that impede its ability to adhere to a workpiece. The contaminated tacky surface 50 may be removed and replaced with a clean tacky surface 50.

Figure 5A:
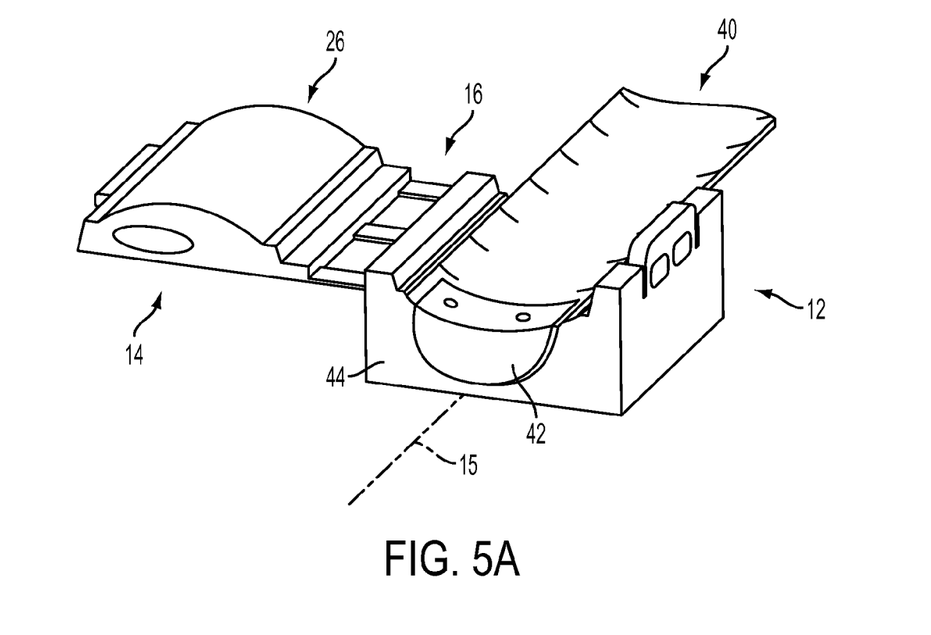
FIGS. 5A and 5B are perspective views of a tool accepting a measuring tape.
Figure 5B:
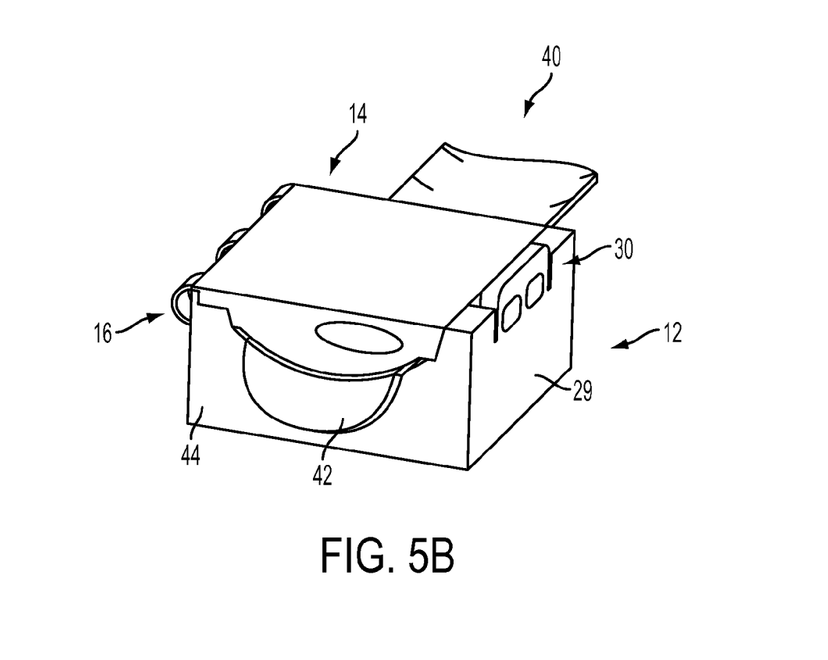

FIG. 5A is a perspective view of a tool 10 accepting a measuring tape 40 and FIG. 5B is a perspective view of the tool 10 secured to the measuring tape 40. As illustrated, the measuring tape 40 may include a downwardly extending metal claw 42. The measuring tape 40 may also have an arcuate cross-sectional profile. In one embodiment, the curve of the cavity 20 (FIG. 2) is similar to the cross-sectional profile of the measuring tape 40. The body 12 has a front surface 44 that the metal claw 42 may contact when the measuring tape 40 is placed in the cavity 20 by the user. The measuring tape 40 is received by the cavity 20 and extends along the longitudinal axis 15 of the body 12. FIG. 5B illustrates the tool 10 after the cap 14 has been engaged to the body 12 via the closure 30. Once the cap 14 is engaged to the body 12, relative movement between the measuring tape 40 and the tool 10 is eliminated, or at least reduced, due to the force exerted by the protruding portion 26 upon the measuring tape 40. As is to be appreciated, the tool 10 may receive measuring tapes 40 having different widths or cross-sectional profiles. For example, the tool 10 may receive both relatively wide measuring tape as well as relatively narrow measuring tapes. Additionally, the tool 10 may be positioned along the measuring tape 40 at any desired location along its span. For example, if a user is measuring a long object, the tool may be placed on the measuring tape 40 at the midpoint between the user and the edge of the material. As is to be appreciated, a user may attach multiple tools 10 to the measuring tape 40, such as for measuring relatively long spans. Furthermore, when the cap 14 is engaged to the body 12, it may exert sufficient force to maintain the tool's relative placement along the measuring tape 40. In some embodiments, the cap 14 may not exert sufficient force to maintain the tool's relative placement, thereby allowing the tool 10 to slide along the measuring tape 40. In one embodiment, the closure 30 comprises a two-stage closure. In the first stage, the cap 14 is secured to the body 12, by the tool 10 may slide along the measuring tape 40. In the second stage, the cap 14 and body 12 may exert sufficient force to maintain the tool's relative placement on the measuring tape 40.

Figure 6:
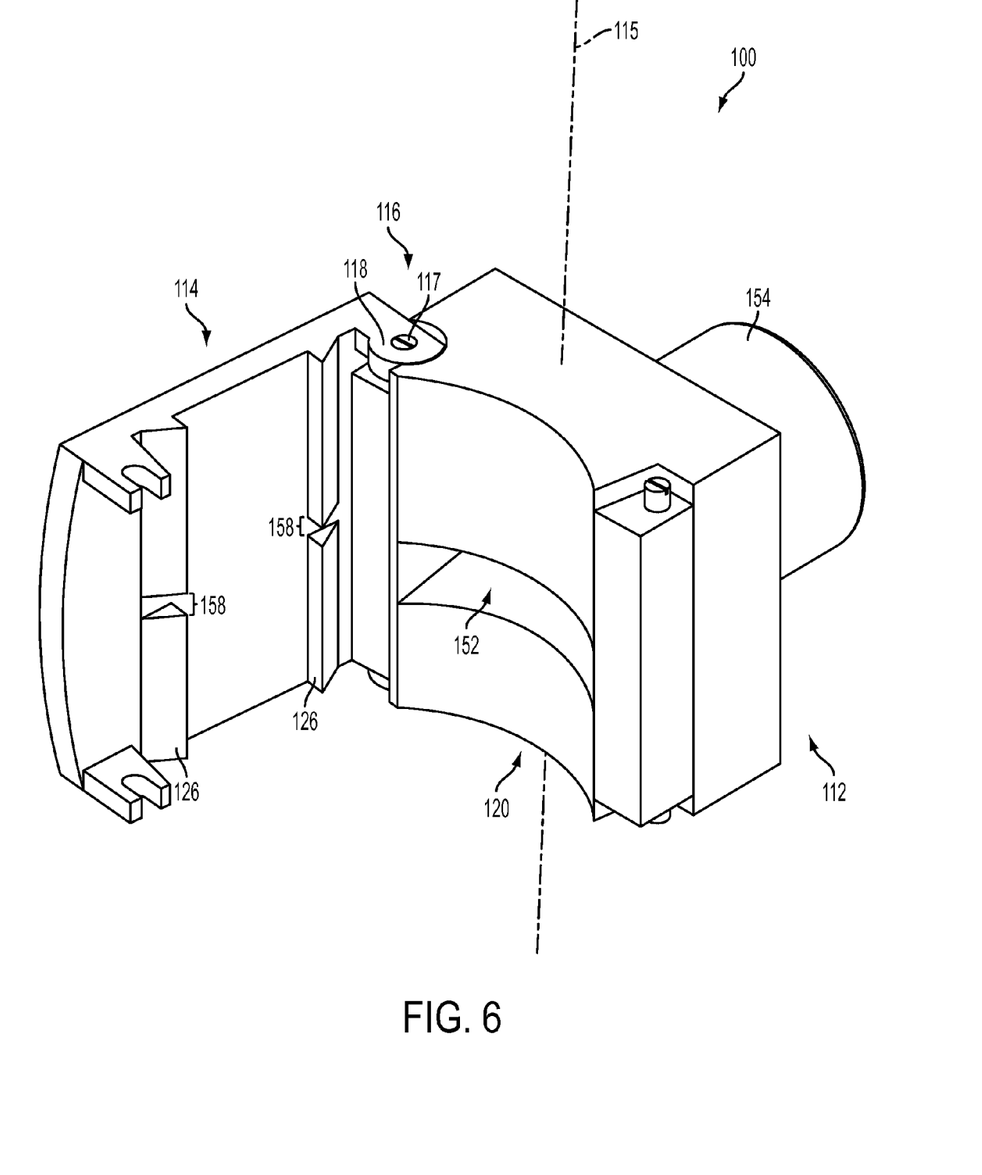
FIG. 6 is a perspective view of a in accordance with one non-limiting embodiment

FIG. 6 is a perspective view of a tool 100 in an open position in accordance with one non-limiting embodiment. In one embodiment, the tool 100 has a body 112 and a cap 114. The body 112 may be any suitable shape, such as rectangular, for example. The body 112 defines a longitudinal axis 115. In one embodiment, the body 112 has a length (illustrated as "L") in the longitudinal direction of about 2". In some embodiments, the length L may be in the range of about 0.5" to about 2.25", for example. The cap 114 may be hingedly attached to the body 112. A hinge 116 couples the cap 114 to the body 112. In one embodiment, the hinge 116 comprises a pin 117 and a socket 118. In other embodiments, other suitable types of hinges may be used, such as a living hinge or a plurality of flexible connectors, for example.

Figure 7:
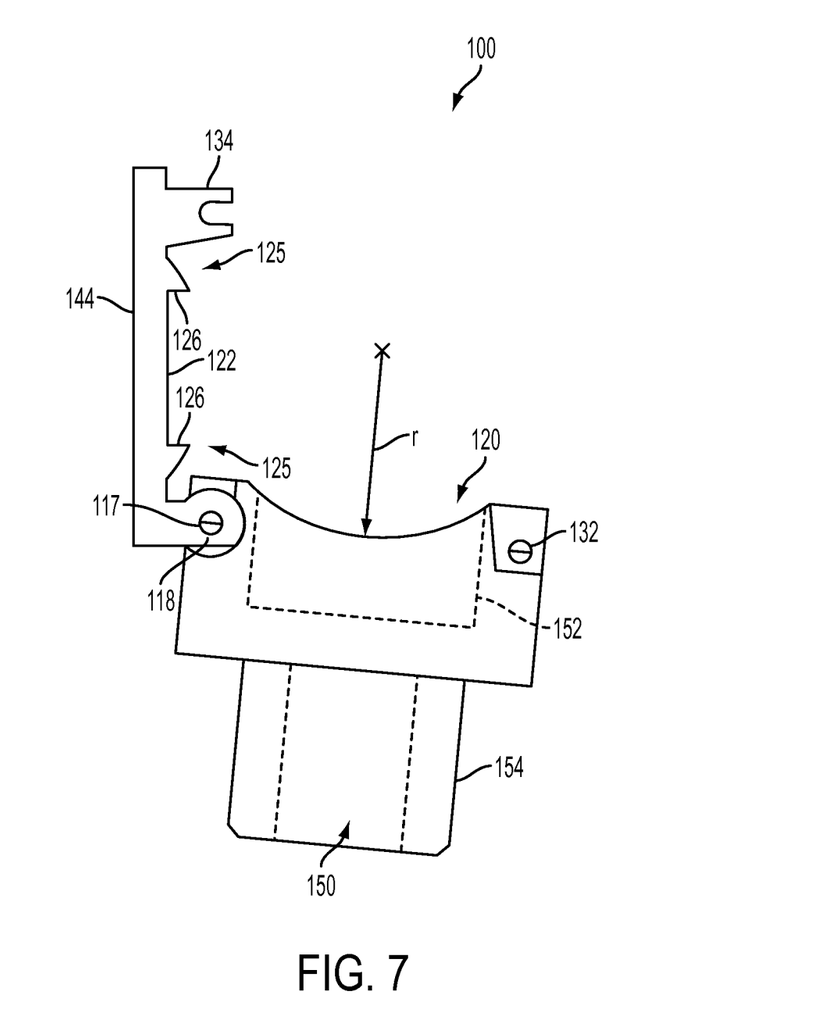
FIG. 7 is an end view of the tool of FIG. 6 in an open position.
Figure 8:
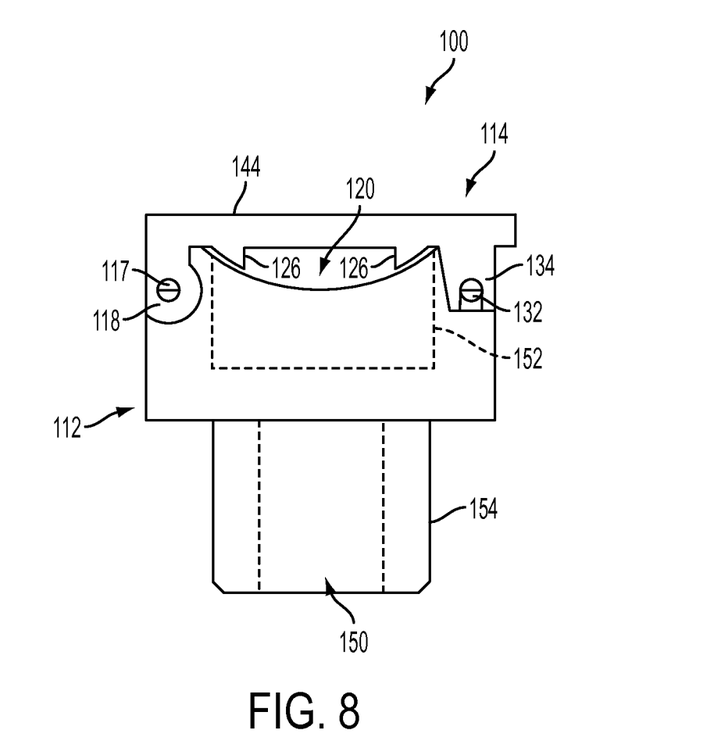
FIG. 8 is an end view of the tool of FIG. 6 in a closed position.

FIG. 7 is an end view of the tool 100 in the open position. FIG. 8 is an end view of the tool 100 in the closed position. As illustrated in FIGS. 6-8, the body 112 defines a cavity 120 that extends along the longitudinal axis 115. The cavity 120 may be concave, having an arc with a radius "r". The cap 114 may have an inner surface 122 and an outer surface 144. The inner surface 122 may define at least one protruding portion 125. In one embodiment, the protruding portion 125 comprises a ridge 126. The ridge 126 may be oriented in any suitable orientation. In one embodiment, as illustrated, the inner surface 122 comprises two parallel ridges 126 that extend along the longitudinal axis 115. The ridges 126 may have a generally triangular cross-sectional profile. In one embodiment, one surface of the triangular ridge 126 is curved to match the curvature of the cavity 120. In other embodiments, the ridges have other suitable cross-sectional profiles, such as rounded or squared, for example.

Still referring to FIGS. 6-8, the tool 100 may define a mounting cavity 150 for receiving a rigid member, such as a nail, screw, surveying spike, metal rod, or bolt, for example. In one embodiment, the tool 100 comprises a mounting shaft 154. The mounting shaft 154 may be cylindrical, as illustrated, or may be any other shape. In one embodiment, the mounting shaft 154 is square. The mounting shaft 154 may define the mounting cavity 150. As is to be appreciated, in some embodiments, the tool 100 may define a plurality of mounting cavities 150. As discussed in more detail below, the mounting cavity 150 may be used to assist the user in obtaining measurements.

In some embodiments, the cavity 120 may define a notch 152. The notch 152 may be substantially perpendicular to the longitudinal axis 115 and extend laterally across the cavity 120. The notch 152 may extend less than width of the body 112 (as illustrated) or may extend across the entire width of the body 112. The notch 152 is generally aligned with the center of cavity 150. During use, the notch 152 may receive, for example, the metal claw 42 (FIG. 5A) of a measuring tape or receive a ring-type metal loop of an engineer's tape. In some embodiments, the ridges 156 may have gaps 158 (FIG. 6) to accommodate the insertion of metal claw or ring-type metal loop into the notch 152.

Figure 9:
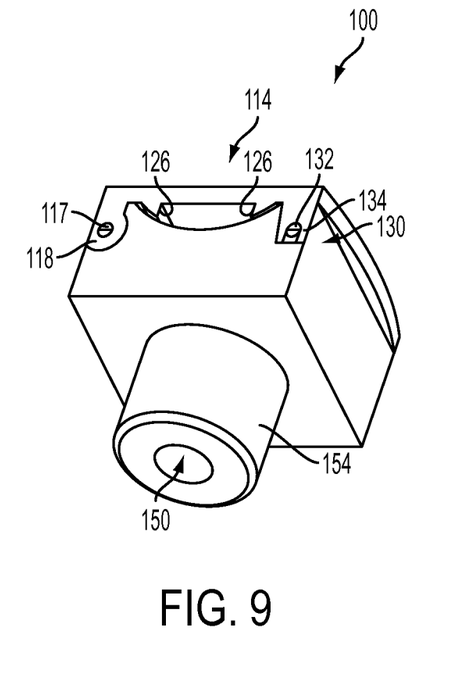
FIG. 9 is a perspective view of the a tool in a closed position.

FIG. 9 is a perspective view of the tool 100 in a closed position in accordance with one non-limiting embodiment. As illustrated in FIGS. 8 and 9, the ridges 126 extends into the cavity 120. A closure 130 may be used to selectively secure the cap 114 to the body 112. In one embodiment, the closure 130 comprises a first closure portion 132 coupled to the body 112 and a second closure portion 134 coupled to the cap 114. In one embodiment, the first closure portion 132 is a pin and the second closure portion 134 is a latch. As is to be appreciated, the closure 130 may be implemented using any suitable technique.

Figure 10A:
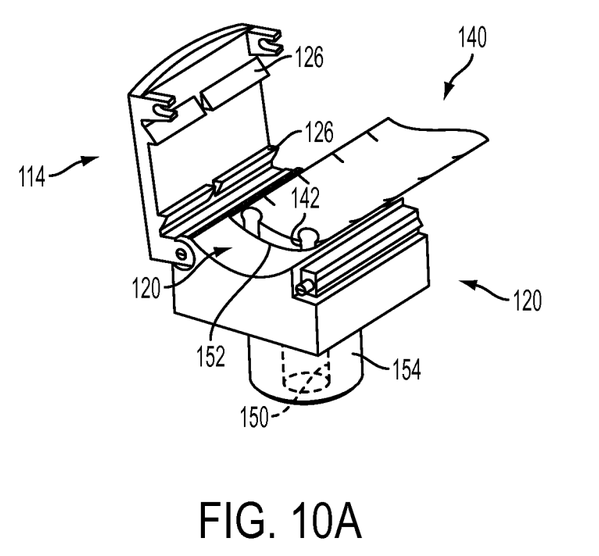
FIGS. 10A and 10B are perspective views of a tool accepting a measuring tape.
Figure 10B:
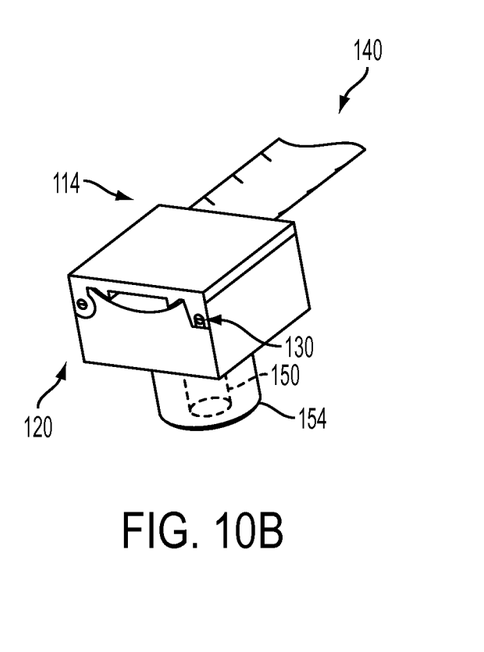

FIG. 10A is a perspective view of a tool 100 accepting a measuring tape 140 and FIG. 10B is a perspective view of the tool 100 secured to the measuring tape 140. The measuring tape 140 may be an engineer's tape that includes a metal ring-type loop 142, as illustrated. The loop 142 may be received by the notch 152. FIG. 10B illustrates the tool 100 after the cap 114 has been engaged to the body 112 via the closure 130. Once the measuring tape 140 has been engaged to the tool 100, the tool 100 may be mounted to a variety of objects to obtain a measurement. For example, metal posts may be driven in the ground that have diameters similar to the inner diameter of the cavity 150. The tool 100 can be mounted to the post to obtain an "on-center" measurement from the post. Furthermore, a nail or screw can be driven into a workpiece and then the tool 100 can subsequently be place onto the head of the screw or nail such that the head is received into the cavity 150. In some embodiments, the tool 100 may include both a mounting cavity 150 and a tacky surface.

Figure 11:
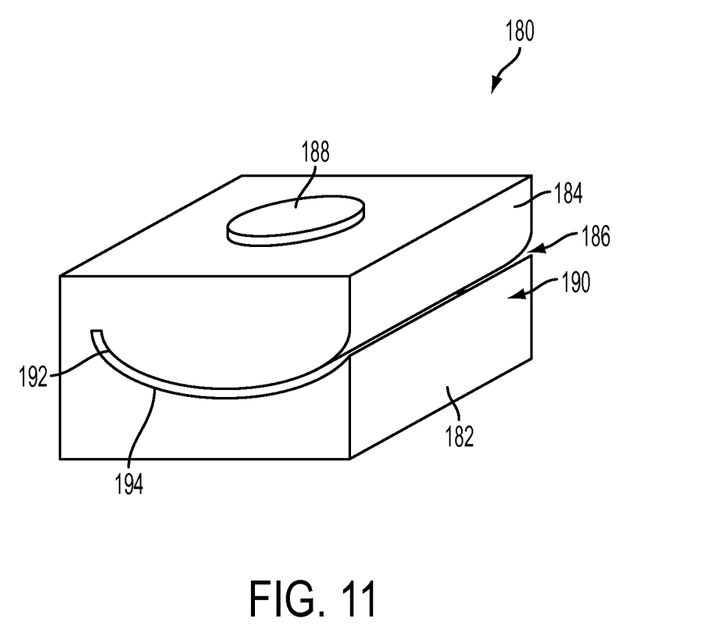
FIG. 11 is a perspective view of a tool in accordance with one non-limiting embodiment.

FIG. 11 is a perspective view of a tool 180 comprising a body 182 and a cap 184 in a non-hinged configuration. The tool 180 may comprise a mount, such as an adhesive pad 188, on at least one outer surface. The cap 184 may be coupled to, or unitary with, the body 182 in a fixed relationship. In one embodiment, the body 182 and the cap 184 are formed from a single piece of material. The cap 184 may have a protruding portion 192 and the body 182 may define a cavity 194. The tool 180 may define a slot 186 intermediate the protruding portion 192 of the cap 184 and the cavity 194 of the body 182. As illustrated, the slot 186 may partially extend into the tool 180 from a side surface 190, for example. In one embodiment, the slot 186 has a curvature similar to the curvature of a measuring tape that is defined by the interaction between the protruding portion 192 and the cavity 194. To attach the tool 180 to a measuring tape (not shown), a user may laterally slide the measuring tape into the slot 186 via the opening in the side surface 190. To remove the tool 180 from the measuring tape, the user may laterally slide the measuring tape out of the slot 186. In some embodiments, the side surface 190 may comprise a latch, for example, to secure the measuring tape in the slot 186 during use.

Figure 12:
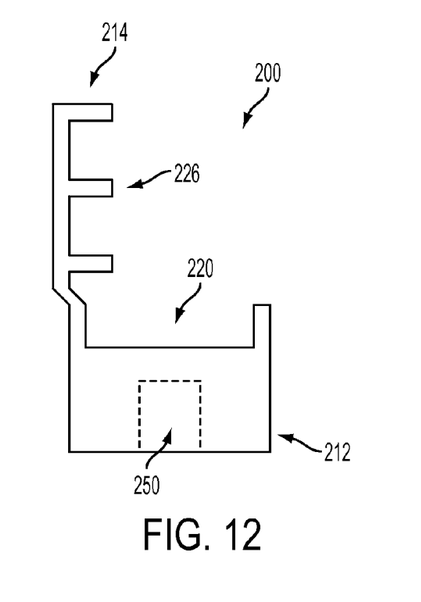
FIGS. 12-16 are end views of tools in accordance with various embodiments.
Figure 13:
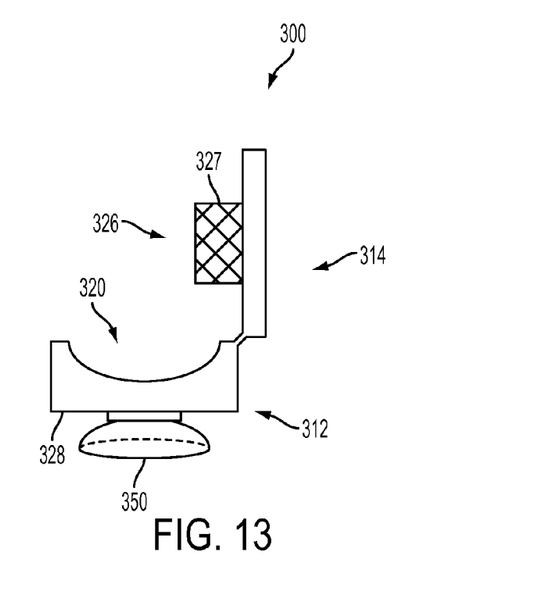
Figure 14:
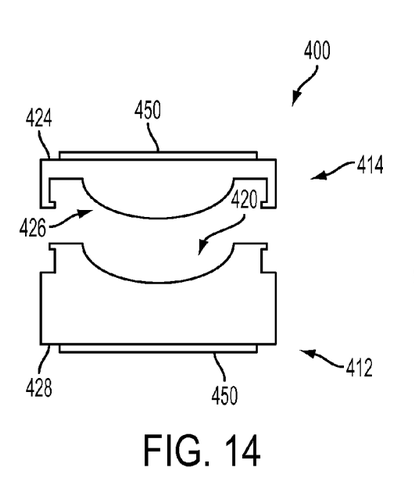

FIGS. 12-16 illustrates tools in accordance with various embodiments. FIG. 12 is an end view of a tool 200 in accordance with one non-limiting embodiment. The tool 200 has a body 212 attached to a cap 214. The body 212 defines a rectangular cavity 220. The cap 214 has a protruding portion 226 that includes a plurality of rectangular ridges. The body 212 defines a mounting cavity 250. FIG. 13 is an end view of a tool 300 in accordance with one non-limiting embodiment. The tool 300 has a body 312 attached to a cap 314. The body 312 defines a cavity 320. The cap 314 has a protruding portion 326 that includes a foam member 327. A suction cup 350 is positioned on the bottom surface 328 of the body 312 as a mounting member. FIG. 14 is an end view of a tool 400 in accordance with one non-limiting embodiment. The tool 400 has a cap 414 that is attachable to a body 412. The body 412 defines a cavity 420. The cap 414 has a rounded protruding portion 426 that extends into the cavity 420 when the cap 414 is attached to the body 412. Tacky surfaces 450 are positioned on the bottom surface 428 of the body 412 and the outer surface 424 of the cap 414.

Figure 15:
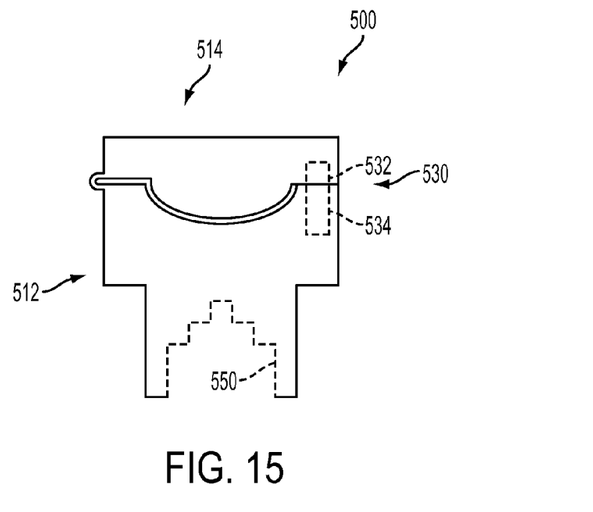

FIG. 15 is an end view of a tool 500 comprising a magnetic closure 530 in accordance with one non-limiting embodiment. The tool 500 has a cap 514 that is hingedly attached to the body 512. The cap 514 comprises a first magnetic element 532 and the body 512 comprises a second magnetic element 534. In some embodiments, one of the magnetic elements 532, 534 may be a magnet while the other element may be a ferrous material. In one embodiment, the cap 514 defines a bore or a groove that receives the first magnetic element 532 and the body 512 defines a bore or a groove that receives the second magnetic element 534. The cap 514 is held in the closed position via the magnetic attraction between the first and second magnetic elements 532, 534. The tool 500 may also define a mounting cavity 550 that comprise tiered sidewalls. The tiered sidewalls allow, for example, the tool 500 to be mounted to a variety of objects which have different outer diameters.

Figure 16:
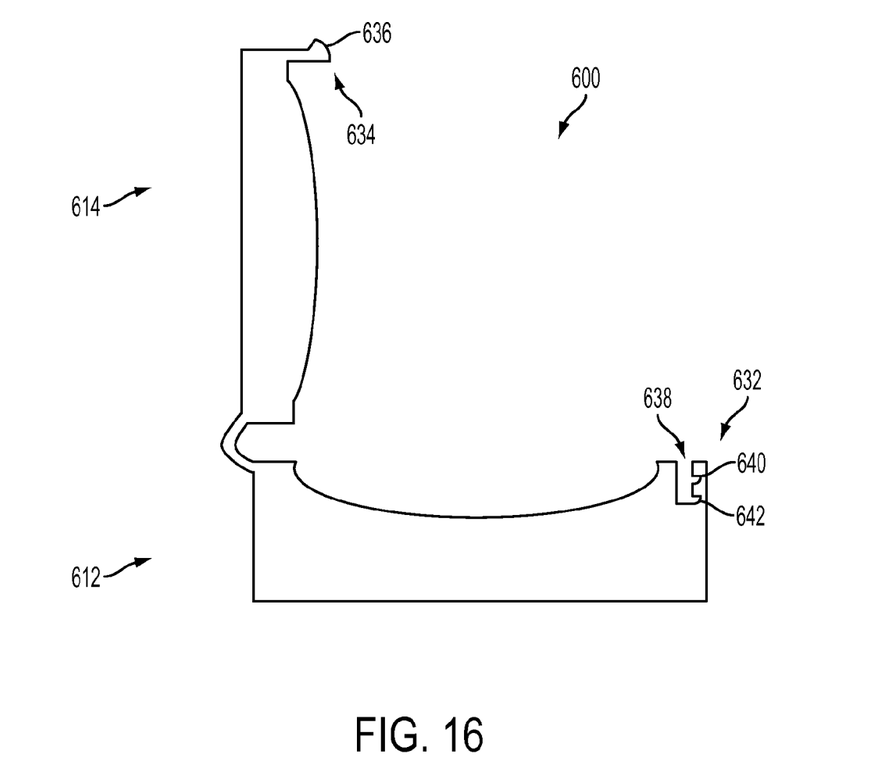

FIG. 16 is an end view of a tool 600 comprising a two-stage closure 630 in accordance with one non-limiting embodiment. The tool 600 comprises a cap 614 that is hingedly attached to a body 612. In one embodiment, the two-stage closure 632 comprises an insertion member 634 positioned on the cap 614 and a notch 638 defined by the body 612. The insertion member 634 may comprise, for example, a protrusion 636 and the notch 638 may define a first detent 640 and a second detent 642. A measuring tape may be placed on the body 612 and the cap 614 may be moved into a first closed position with the protrusion 636 received by the first detent 640. In this first stage of closure, the tool 600 may readily slide along the measuring tape. The user may optionally move the cap 614 into the second stage of closure and push the cap 614 towards the body 612 such that the protrusion 636 is received by the second detent 642. In this second position, the cap 614 is brought closer to the body 612 and the tool 600 engages the measuring tape such that the tool 600 does not readily slide with respect to the measuring tape. As is to be appreciated, depending on the particular use of the tool 600, the user may decide whether to use the first or second stage of closure.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments. The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm". Additionally, it will be appreciated that for conciseness and clarity, spatial terms such as "vertical," "horizontal," "up," and "down" may be used herein with respect to the illustrated embodiments. However, the devices described herein may be used in many orientations and positions, and these terms are not intended to be limiting and absolute.

I claim:

1. A removable and attachable apparatus for attachment to a measuring tape, the measuring tape comprising an end and an intermediate portion, the end comprising a claw or loop, the removable and attachable apparatus comprising:
    a body having a longitudinal axis, the body defining a cavity along the longitudinal axis, the cavity dimensioned to receive the measuring tape, the cavity comprising a notch dimensioned to receive the claw or loop of the end of the measuring tape when the end is received in the cavity, the intermediate portion of the measuring tape extending past the notch and the end of the measuring tape extending beyond the body when the intermediate portion is received in the cavity;
    a cap attached to the body, the cap having an inner surface and an outer surface, the inner surface comprising a protruding portion, the protruding portion protruding into the cavity, the protruding portion dimensioned to clamp the measuring tape between the cap and the body; and
    a mount coupled to at least one of the body and the cap.

2. The apparatus of claim 1, wherein the cap is integrally formed from a single piece of material.

3. The apparatus of claim 1, further comprising:
    wherein the cap and the body are integrally formed together from the single piece of material.

4. The apparatus of claim 1, wherein the body has a length in the longitudinal axis in the range of about 0.5" to about 2.25".

5. The apparatus of claim 1, wherein the cavity is a concave cavity, and the protruding portion is convex and substantially parallel to the concave cavity in the closed position.

6. The apparatus of claim 1, wherein the protruding portion comprises at least one ridge extending along the inner surface and substantially parallel to the longitudinal axis.

7. The apparatus of claim 6, wherein the at least one ridge has a generally triangular cross-sectional profile.

8. The apparatus of claim 1, comprising:
    a hinge attached to the body;

the cap attached to the hinge, the cap moveable between an open position and a closed position, the protruding portion protruding into the cavity in the closed position; and a closure, the closure locking the cap to the body in the closed position.

9. The apparatus of claim 8, wherein the mount is one of a tacky mounting surface, a suction cup, and a mounting cavity.

10. The apparatus of claim 8, wherein the body defines a lateral notch substantially perpendicular to the longitudinal axis.

11. The apparatus of claim 1, further comprising:

a closure comprising a first closure portion and a second closure portion, the body comprising the first closure portion and the cap comprising the second closure portion, the closure locking the cap to the body in the closed position;

wherein the closure is a two stage closure, the cap having a second closed position, the apparatus configured so that, when the cap is in the second closed position, the protruding portion of the cap exerts a clamping force on the contoured portion of the measuring tape received in the cavity sufficient to prevent the tape from readily sliding longitudinally through the cavity.

12. The apparatus of claim 11, wherein the cap and the body are integrally formed together from the single piece of material.

13. A removable and attachable apparatus for attachment to a measuring tape, the removable and attachable apparatus comprising:

a body having a longitudinal axis, the body defining a cavity along the longitudinal axis, the cavity dimensioned to receive the measuring tape, the body defining a lateral notch substantially perpendicular to the longitudinal axis, the lateral notch extending into the body along a transverse axis;

a hinge attached to the body;

a cap attached to the hinge, the cap having an inner surface and an outer surface, the cap moveable between an open position and a closed position;

at least one of the inner surface and the body comprising at least one ridge; and at least one of the cap and the body defining a mounting cavity, the mounting cavity at least partially aligned with the transverse axis.

14. The apparatus of claim 13, wherein the body comprises a mount.

15. The apparatus of claim 14, the mount further comprising a tacky mounting surface.

16. The apparatus of claim 13, wherein the cavity is a concave cavity and the mounting cavity has a substantially circular cross-sectional profile.

17. The apparatus of claim 13, the body having a lateral outer width, the lateral notch laterally extending less than the outer lateral width.

18. The apparatus of claim 13, wherein the at least one ridge has a generally triangular cross-sectional profile.

19. The apparatus of claim 18, wherein the at least one ridge comprises a first ridge and a second ridge, the first and second ridges coupled to the inner surface of the cap and extending substantially along the longitudinal axis.

20. The apparatus of claim 19, wherein the first and second ridges are substantially parallel.

21. The apparatus of claim 13, wherein the body comprises a cylindrical mounting shaft, the cylindrical mounting shaft defining the mounting cavity.

22. The apparatus of claim 13, comprising at least one tacky outer surface.

23. The apparatus of claim 13, wherein the cap comprises a notch extending into the cap, and wherein the notch is substantially aligned with the lateral notch of the body when the cap is in a closed position.

\* \* \* \* \*